(12) United States Patent
Careau et al.

(10) Patent No.: US 7,217,220 B2
(45) Date of Patent: May 15, 2007

(54) DRIVE ROLLER CONTROL FOR TORIC-DRIVE TRANSMISSION

(75) Inventors: Fernand Careau, Montréal (CA); Hugues Maltais, Marieville (CA)

(73) Assignee: S.O.E. Technologies Inc., Saint-Mathieu-de-Beloeil, Quebec (CA)

( * ) Notice: Subject to any disclaimer, the term of this patent is extended or adjusted under 35 U.S.C. 154(b) by 455 days.

(21) Appl. No.: 10/654,894

(22) Filed: Sep. 5, 2003

(65) Prior Publication Data

US 2004/0214684 A1 Oct. 28, 2004

(30) Foreign Application Priority Data

Sep. 5, 2002 (CA) .................................. 2401474

(51) Int. Cl.
*F16H 15/38* (2006.01)
(52) U.S. Cl. .......................................... 476/40; 476/46
(58) Field of Classification Search .................. 476/40, 476/42, 46
See application file for complete search history.

(56) References Cited

U.S. PATENT DOCUMENTS

| | | | |
|---|---|---|---|
| 2,124,398 A | * | 7/1938 | Hayes ........................... 476/40 |
| 2,962,909 A | * | 12/1960 | Jaquith et al. ................. 476/45 |
| 3,153,938 A | * | 10/1964 | Forbes ........................ 476/40 |
| 3,933,054 A | | 1/1976 | Iseman |
| 5,607,372 A | | 3/1997 | Lohr |
| 5,820,510 A | | 10/1998 | Ueda et al. |

OTHER PUBLICATIONS

Careau, Fernand, and Maltais, Hugues, *Variateur toroïdal*, slide show presented at an engineering competition in Québec City, Canada, Jan. 20-27, 2000, and in an engineering competition in Waterloo, Canada, in Mar. 2000.

Careau, Fernand, *Conception d'un groupe motopropulseur monobloc intégrant une C.V.T. toroïdale—Mini Baja 2000*, presented during an engineering course on Dec. 16, 1999.

Fournier, Marc, *toric.avi*, video presentation, presented to a laboratory teacher in Aug. 2000 as a project in a video simulation course.

* cited by examiner

*Primary Examiner*—William C. Joyce

(57) ABSTRACT

A toric-drive transmission comprising a drive disk for receiving a power input. A driven disk transmits a power output. A roller device has a roller displaceably mounted between the drive disk and the driven disk. The roller has three rotational degrees of freedom. A first degree of freedom transmits motion from the drive disk to the driven disk to convert the power input to the power output. A second degree of freedom varies a ratio of the power output to the power input as a function of an orientation of the roller along the second degree of freedom. A third degree of freedom initiates a rotation of the roller about the second degree of freedom. A controller system is operatively connected to the roller device for changing the orientation of the roller in the second degree of freedom by actuating a displacement of the roller in the third degree of freedom.

4 Claims, 6 Drawing Sheets

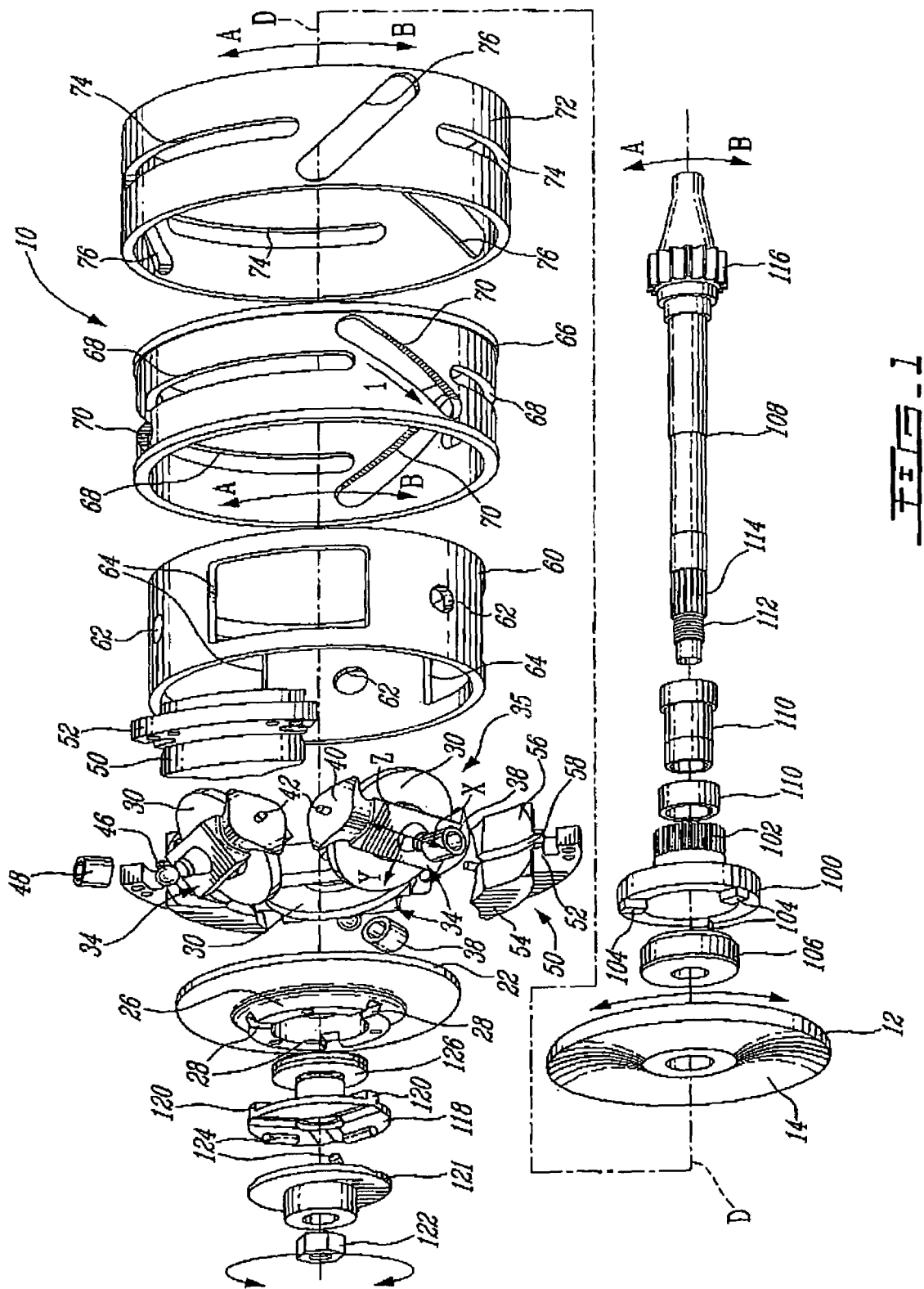

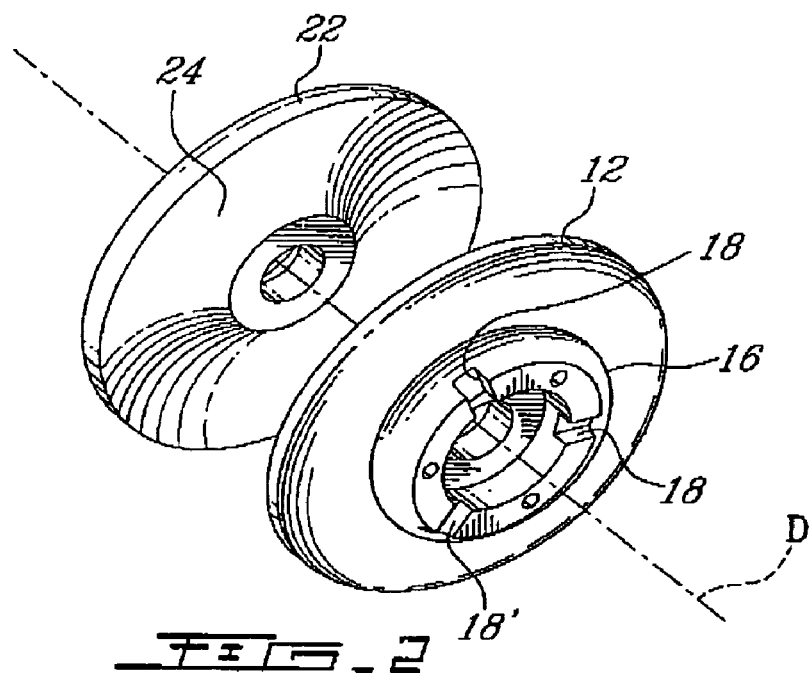
FIG_2
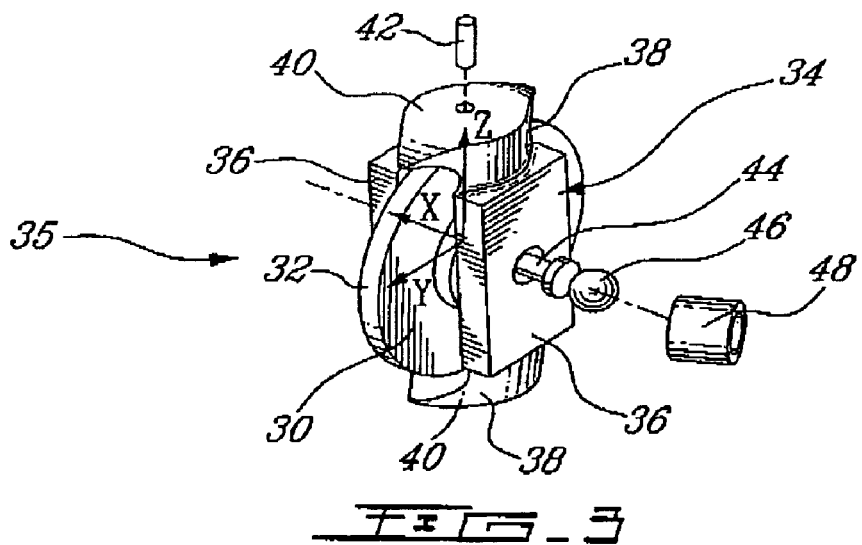
FIG_3
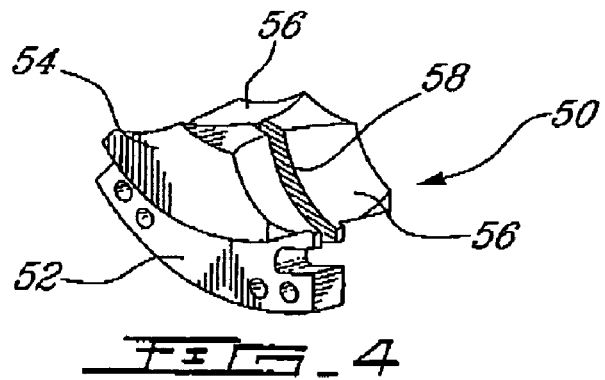
FIG_4

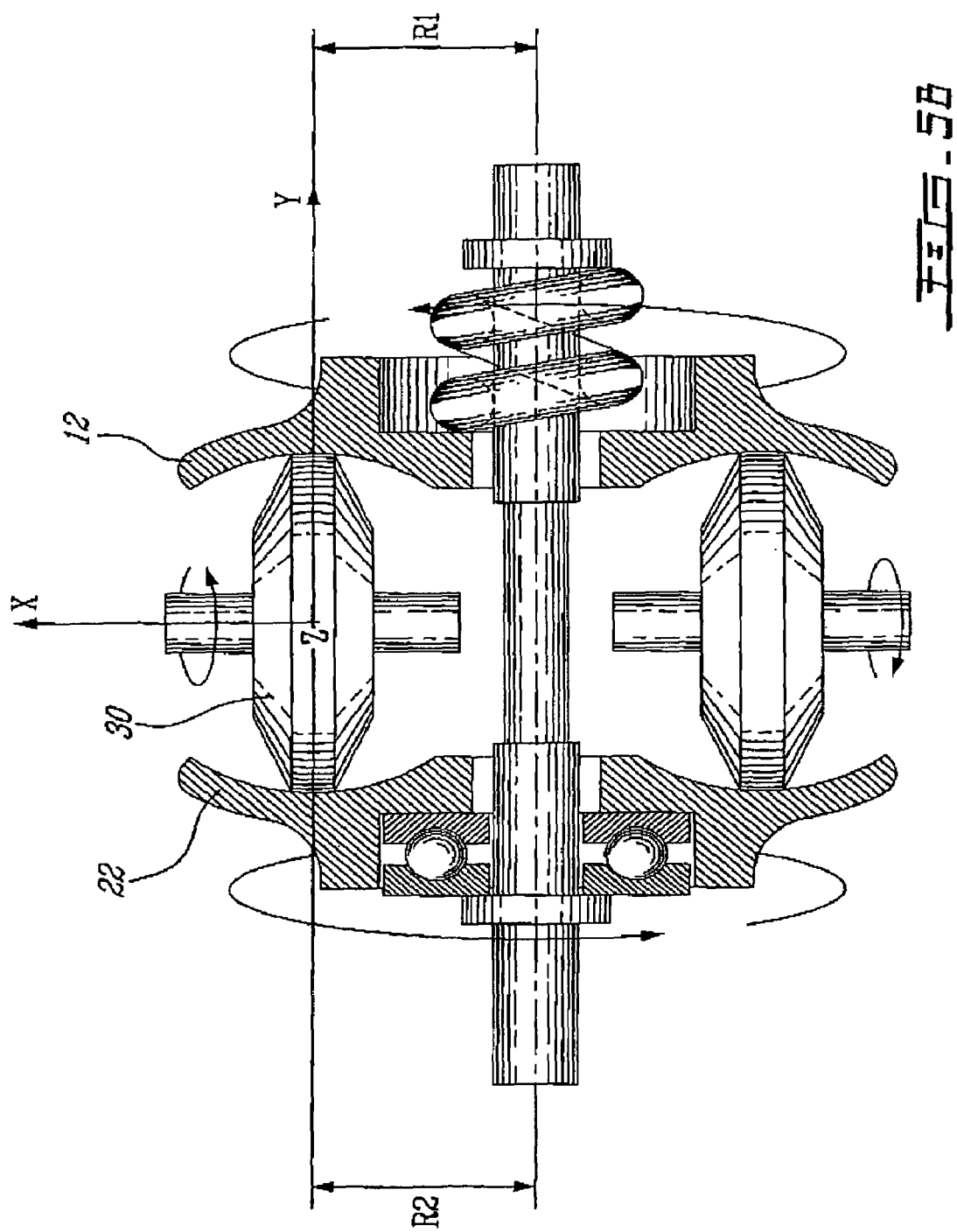

DRIVE ROLLER CONTROL FOR TORIC-DRIVE TRANSMISSION

TECHNICAL FIELD

The present invention generally relates to a toric-drive continuously variable transmission and, more particularly, to a drive roller control for use therewith.

BACKGROUND ART

Transmissions are used in motorized vehicles to transmit the engine power to the propelling system of the vehicles (i.e., wheels, propellers, etc.). Various types of transmissions adapt to the different engines and motors in order to propel the vehicle. An internal combustion engine, for instance, does not behave like an electric motor. An electric motor evolves between a full stop to high running speeds at high efficiencies. Therefore, a transmission may couple the electric motor directly to the propelling system. An internal combustion engine, on the other hand, will not run below a minimal revolutions per minute (RPM) and is also limited with respect to the maximal RPM it may attain. Therefore, the transmission used with such engines requires a clutching mechanism in order to allow the internal combustion engine to run while the vehicle is idle. Furthermore, the transmission must allow ratio changes between the engine output and the propelling system input, as high torque is typically required initially to propel the idle vehicle forward, to the detriment of the vehicle speed. Thereafter, lower torque is supplied for higher speed.

There are generally two main types of transmissions for internal combustion engine vehicles in the automotive industry: the discontinuous ratio transmission and the continuously variable transmission (CVT). The difference between the two types of transmission is comparable to the relation, in mathematics, between integers and real numbers. There are five integers comprised between 1 and 5 inclusively, whereas there is an infinity of real numbers between the same interval. The translation from an integer to the next integer implies a jump, a discontinuity. A discontinuous ratio transmission has such jumps. For instance, a five-speed vehicle has five different ratios, the ratio being the rotational speed at the inlet divided by the rotational speed at the outlet of the transmission. On the other hand, CVT's have an infinite ratio of speeds between inlet and outlet of the transmission, extending between a minimal ratio and a maximal ratio.

Discontinuous ratio transmissions are found on most cars, as they are highly efficient (in the vicinity of 95%) and highly reliable as there are no efficiency losses due to slip or overheating, and these transmissions are closed from water and dust damage. On the other hand, the discontinuity between the speed ratios and the necessity for clutching to switch speeds are major inconveniences. There is a loss in engine power, although small, when switching from one ratio to another. These transmissions also are more complex and require synchronization between the ratio changes. Furthermore, in difficult conditions, driver ability comes into account.

One type of CVT, the toric-drive transmission, involves a drive disk and a driven disk adjacent to one another, and shaped so as to form together a torus-shaped cavity. Rollers are positioned in the torus-shaped cavity so as to transmit motion from the drive disk to the driven disk. The input-to-output ratio changes as a function of the orientation of the rollers with respect to the disks, but is continuous. With CVT's, the change of speed and ratios is effected without discontinuity. The CVT's are also very flexible in allowing to optimize the use of the engine to which they are connected. However, CVT's are typically less energy-efficient than discontinuous ratio transmissions. For instance, in some type of toric-drive transmissions, actuation is required to displace rollers between the drive disk and the driven disk to change orientation, and hence vary the input-to-output ratio. More specifically, a translation of the rollers is caused to initiate a change in orientation to change the input-to-output ratio, whereby a non-negligible amount of actuation is used to cause the translation.

SUMMARY OF INVENTION

Therefore, it is a feature of the present invention to provide a novel continuously variable transmission.

It is a further feature of the present invention to provide a continuously variable transmission having an increased energy efficiency.

It is a still further feature of the present invention to provide a continuously variable transmission in which the amount of force required to actuate a change in input-to-output ratio is reduced.

It is a still further feature of the present invention to provide a method for controlling a power input/output ratio in a continuously variable transmission.

According to the features of the present invention, from a broad aspect, there is provided a toric-drive transmission comprising: a drive disk for receiving a power input; a driven disk for transmitting a power output; a roller device having a roller displaceably mounted between the drive disk and the driven disk, the roller having three rotational degrees of freedom, a first one of the rotational degrees of freedom for transmitting motion from the drive disk to the driven disk so as to convert the power input to the power output, a second one of the rotational degrees of freedom for varying a ratio of the power output to the power input as a function of an orientation of the roller along the second one of the rotational degrees of freedom, and a third one of the rotational degrees of freedom for initiating rotation of the roller about the second one of the rotational degrees of freedom; and a controller system operatively connected to the roller device for changing the orientation of the roller in the second one of the rotational degrees of freedom by actuating a displacement of the roller in the third one of the rotational degrees of freedom.

Further in accordance with the features of the present invention, there is provided a method for controlling a power input/output ratio of a toric-drive transmission of the type having a pair of disks forming a torus-shaped cavity with a roller in the torus-shaped cavity, the roller having a first rotational degree of freedom associated with a transmission of motion between the disks, a second rotational degree of freedom associated with the power input/output ratio, and a third rotational degree of freedom associated with a path of the roller on the disks, the method comprising the steps of: displacing the roller from a first orientation to a predetermined second orientation in the third rotational degree of freedom so as to change the path of the roller on the disks, in which the roller will tend to return to the first orientation; and guiding the roller into a change of orientation in the second rotational degree of freedom when the roller returns to the first orientation; whereby the power input/output ratio is changed as a function of the predetermined second orientation in the third rotational degree of freedom.

BRIEF DESCRIPTION OF DRAWINGS

A preferred embodiment of the present invention will now be described with reference to the accompanying drawings in which:

FIG. 1 is an exploded view of a toric-drive transmission in accordance with a preferred embodiment of the present invention;

FIG. 2 is a perspective view of a drive disk and a driven disk in accordance with the preferred embodiment of the present invention;

FIG. 3 is a perspective view of a drive roller in accordance with the preferred embodiment of the present invention;

FIG. 4 is a perspective view of a structure elbow in accordance with the preferred embodiment of the present invention;

FIGS. 5A to 5C are schematic sectioned views of the toric-drive transmission.

DESCRIPTION OF PREFERRED EMBODIMENTS

Figure 5A:
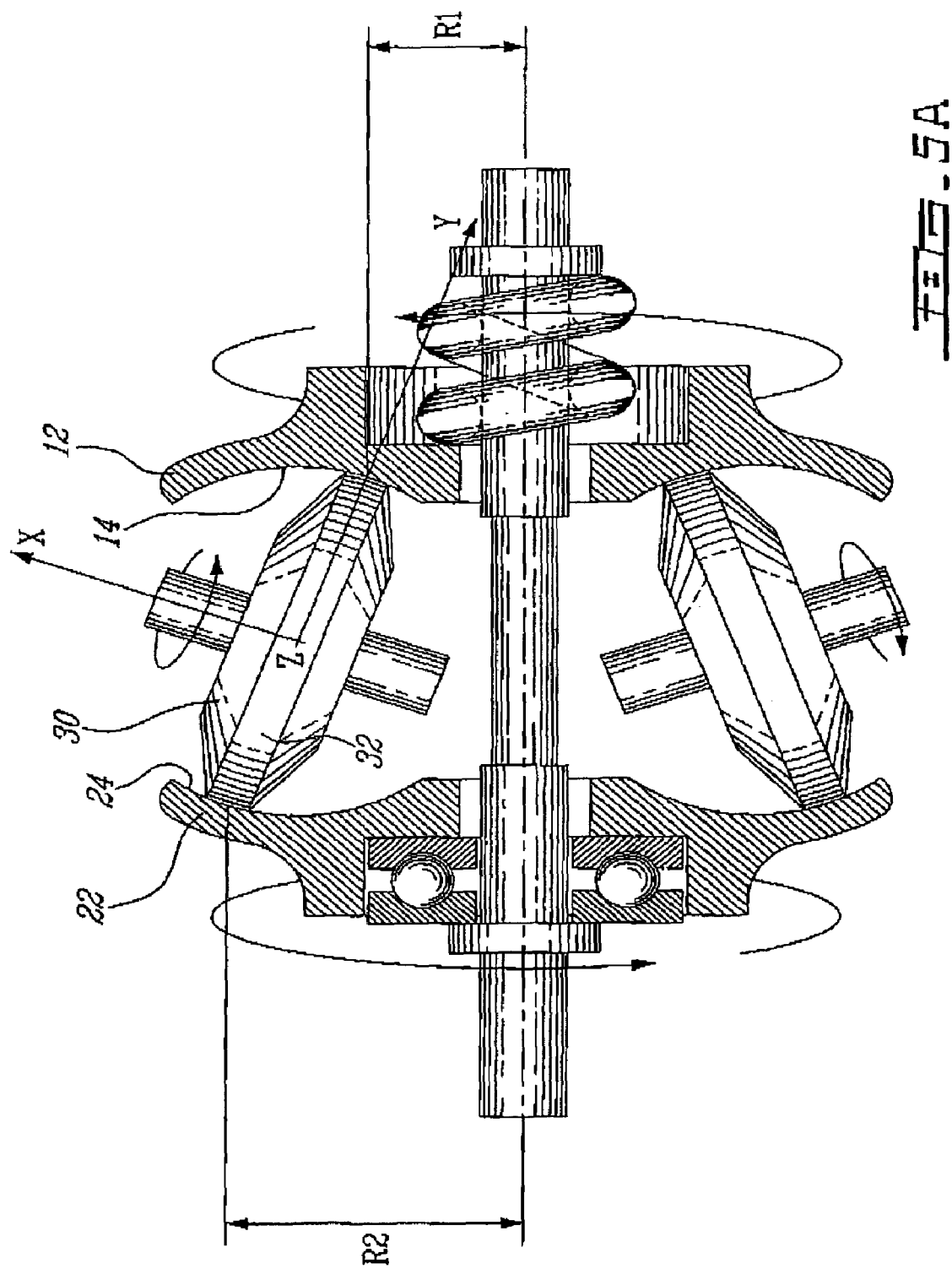

Referring now to the drawings and more particularly to FIG. 1, a toric-drive transmission in accordance with the present invention is generally shown at 10. A protective casing, along with the necessary seals and joints, has been removed from the figures in order to clarify the views of the transmission 10. The toric-drive transmission 10 of the present invention is protected from dust and water, as it is enclosed in the casing (not shown). The various elements of the transmission 10 are shown exploded. A drive axis is generally shown at D.

The transmission 10 comprises a drive disk 12. As seen in FIGS. 1, 2 and 5A to 5C, the drive disk 12 has a groove 14 which is a portion of a torus. The drive disk 12 has on an opposed side a flange 16 (FIG. 2) extending axially with three connection slots 18 therein. A driven disk 22 is a mirror image of the drive disk 12. The driven disk 22, therefore, also has a groove 24 which is a portion of a torus, and on an opposed side a flange 26 (FIG. 1) having three connection slots 28. The drive disk 12 and the driven disk 22 are positioned in the transmission 10 such as to have the grooves 14 and 24 facing each other, and this is well depicted in FIGS. 2 and 5A to 5C. The drive disk 12 and the driven disk 22 together define a torus-shaped cavity (as best seen sectioned in FIGS. 5A to 5C), having a circular section. A circle (not shown) is formed by the centers of all circular sections, and will be referred to hereinafter as the toric circle.

Referring now to FIG. 3, a drive roller is shown at 30. The drive roller 30 is disk-shaped and has a peripheral surface 32. The peripheral surface 32 is slightly convex. The drive roller 30 is held in a drive roller support 34. The drive roller support 34 consists of a pair of parallel plates 36 spaced from one another to receive the driver roller 30 therebetween. A shaft (not shown) serves as an axle for the drive roller 30 and is held at opposed ends by the parallel plates 36. Bearings (not shown) ensure the rolling of the drive roller 30 about the axle held by the parallel plates 36.

Opposed ends of the parallel plates 36 each comprise a head 38, which has a spherical contact surface 40, from which guide pins 42 extend from the middle thereof. One of the two parallel plates 36 has a control arm 44 with a follower sphere 46 at an end thereof. As seen in FIG. 1, the follower sphere 46 is adapted for being received in a socket 48. Each of the sockets 48 is tube-shaped. It is observed in FIG. 1 that the transmission 10 has three drive rollers 30, each mounted to a drive roller support 34. It is pointed out that the transmission 10 of the present invention may be provided with various configurations ranging from one drive roller to a plurality of drive rollers.

Figure 5C:
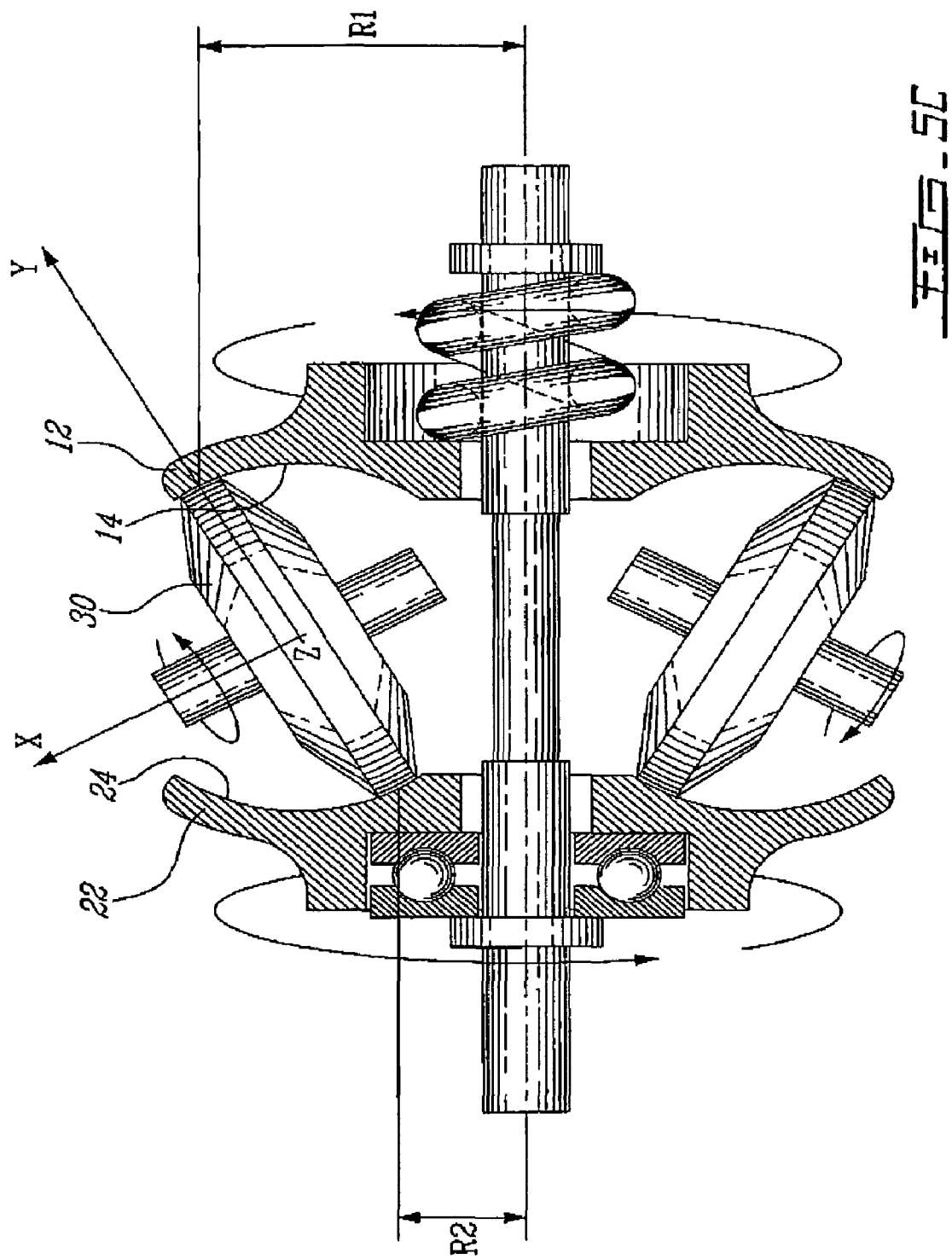

Referring now to FIGS. 5A to 5C, two drive rollers 30 are shown in various positions between the drive disk 12 and the driven disk 22 in order to illustrate the operation of the toric-drive transmission 10. The drive rollers 30 are driven by the drive disk 12 and, therefore, transmit the rotative motion to the driven disk 22. The drive rollers 30 rotate about an X-axis in the transmittal of the rotative motion from the drive disk 12 to the driven disk 22. A Y-axis intersects the X-axis at the geometric center of each of the drive rollers 30, and passes through points of contact between the drive rollers 30, the drive disk 12 and the driven disk 22. A Z-axis is normal to a plane in which lies the X-axis and Y-axis, and intersects the X-axis and the Y-axis at the origin. It is pointed out that the Z-axis is tangential to the toric circle (see above) when the input-to-output ratio of the toric-drive transmission 10 is constant.

The drive rollers 30 may also rotate about the Z-axis in order to change the input-to-output ratio of the transmission 10. The drive roller 30 transmits the rotating motion from the drive disk 12 to the driven disk 22 by being in contact, through its peripheral surface 32, with thin films of oil on the surfaces of the grooves 14 and 24. Nonetheless, for simplicity purposes, the points of transfer of motion between the drive rollers 30 and the drive disk 12 and the driven disk 22 will be referred to as points of contact hereinafter. This will be described in further detail hereinafter. The drive rollers 30 have a third rotational degree of freedom, as they may rotate according to the Y-axis. The Y-axis extends between the point of contact of the drive disk 12 with the drive roller 30 and the point of contact of the drive roller 30 with the driven disk 22. The rotation about the Y-axis will initiate the Z-axis rotation, which will modify the input-to-output ratio. This will be explained in further detail hereinafter.

The drive rollers 30 are positioned between the drive disk 12 and the driven disk 22 such that their geometric centers (i.e., at the origin of the XYZ coordinate systems described above) are on the toric circle. The geometric center of each of the drive rollers 30 generally remains on the toric circle throughout operation of the toric-drive transmission 10.

According to FIG. 5A, the transmission 10 is in speed reduction. In speed reduction, the input-to-output ratio is above 1 as the drive disk 12 (input) rotates faster than the driven disk 22 (output). As the distance R1 from the point of contact between the drive disk 12 and the drive rollers 30 to the center of the drive disk 12 is smaller than the distance R2 from the point of contact between the driven disk 22 and the drive roller 30 to the center of the driven disk 22, the drive disk 12 will rotate faster than the driven disk 22.

A rotation of the drive rollers 30 about their respective Z-axes leads to other ratios, such as that shown in FIGS. 5B and 5C. FIG. 5B illustrates a direct drive between the drive disk 12 and the driven disk 22. In the direct drive, the drive disk 12 and the driven disk 22 rotate at the same speed, giving a ratio of 1 between input (drive disk 12) and output (driven disk 22). This is achieved by distance R1 being equal to distance R2. FIG. 5C illustrates an overdrive between the drive disk 12 and the driven disk 22, and the ratio is therefore below 1. In this case, distance R1 is greater than distance R2, to have the driven disk 22 rotate faster than the drive disk 12. As mentioned above, a vehicle having the toric-drive transmission 10 of the present invention initially has the drive rollers 30 in a speed-reduction position. The input-to-output ratio at that point is above 1, which means that the output speed is below the input speed. Therefore, the torque of the engine is used to provide torque to the wheels. As the vehicle increases speed, the input-to-output ratio is gradually decreased in order to lessen the torque transmitted to the wheels while increasing the speed of the wheels.

Returning to FIG. 1, the toric-drive transmission 10 is shown with the three drive rollers 30, each having a drive roller support 34. For simplicity purposes, each drive roller 30/drive roller support 34 assembly will be referred to hereinafter as assembly 35. Assemblies 35 are each supported between structure elbows 50. The toric-drive transmission 10 has three structure elbows 50 in order to support all three assemblies 35. As best seen in FIG. 4, each structure elbow 50 has an arcuate flange 52, by which it is secured to the casing (not shown) of the transmission 10. The structure elbows 50 are structural, and are thus immovable in the transmission 10. The structure elbows 50 each have an arcuate body 54 from which the arcuate flange 52 projects outwardly. On opposed ends, the arcuate body 54 has spherical contact surfaces 56. The spherical contact surfaces 56 of the structure elbows 50 are adapted for receiving in a coplanar and sliding relationship the spherical contact surfaces 40 of the driver roller supports 34. Therefore, the assemblies 35 may move with respect to the structure elbows 50, which, as mentioned above, are idle in the transmission 10. The spherical contact surfaces 56 each have a channel 58 therein in order to receive the guide pins 42 of the spherical contact surfaces 40. The drive rollers 30 of the assemblies 35 may thus pivot about the Z-axis direction (FIGS. 1 and 3). Furthermore, translation of the assemblies 35 in the channels 58 (via guide pins 42 of the drive roller supports 34) causes rotation of the drive rollers 35 about their respective Y-axes (FIGS. 1 and 3).

As the drive rollers 30 must remain with their geometric center on the toric circle, the spherical contact surfaces 40 and 56 are shaped so as to have their centers coincident with the geometric center of their respective drive roller 30. Furthermore, it is contemplated to provide only one of the spherical contact surfaces 56 of each one of the structure elbows 50 with a channel 58, with the roller supports 34 each provided with a single guide pin 42. This configuration would lessen the risk of the roller supports 34 getting jammed between the structure elbows 50 in a Y-axis rotation, as will be described hereinafter.

Y-axis and Z-axis rotations of the drive rollers 30 will cause changes to the input-to-output ratio of the transmission 10. The control of the Y-axis and Z-axis rotations is achieved by three sleeves: an internal sleeve 60, a drive-mode external sleeve 66, and a reverse-mode external sleeve 72.

The internal sleeve 60 is tube-shaped with three equidistantly spaced holes 62 therein. The holes 62 are adapted to immovably hold the sockets 48. As mentioned above, the sockets 48 host the follower spheres 46 of the drive roller supports 34. The internal sleeve 60 further comprises three generally rectangular openings 64. The openings 64 are equidistantly spaced on the periphery of the internal sleeve 60. When the transmission 10 is assembled, the arcuate flanges 52 of the structure elbows 50 extend through the openings 64 of the internal sleeve 60. The internal sleeve 60 has two degrees of freedom with respect to the casing of the transmission 10. First, the internal sleeve 60 may translate with respect to the drive axis D. The openings 64 are provided in a rectangular shape for this reason, i.e., so as to allow the internal sleeve 60 to translate with the structure elbows remaining idle in supporting the assemblies 35. Second, the internal sleeve 60 can rotate about the drive axis D. Therefore, the openings 64 are longer than the arcuate flanges 52, and the rotational displacement of the internal sleeve 60 is limited by the abutting of the sides of the opening 64 with the arcuate flange 52 (e.g., 4° of play in rotation). The rotation of the internal sleeve 60 with respect to the drive axis D will rotate the drive rollers 30 about their Y-axes, i.e., as the internal sleeve 60 rotates, the sockets 48, which are secured in the holes 62, will guide the drive rollers 30 in rotating about their respective Y-axes, as the follower spheres 46 follow the movement of the sockets 48. This rotation is possible, as mentioned above, by the channels 58 in the structure elbows 50 guiding the guide pins 42. As the channels 58 are oriented in the same direction as the rotation of the internal sleeve 60, the assemblies 35 may be driven into rotating about the Y-axis by a rotation of the internal sleeve 60, thereby making the drive rollers 30 rotate in the Y-axis.

On the other hand, a translation of the internal sleeve 60 along the drive axis D will have the drive rollers 30 rotate in their respective Z-axes. The internal sleeve 60 will rotate the drive rollers 30 through the action of the sockets 48 on the follower spheres 46. More specifically, the drive roller supports 34 will each pivot with respect to the structure elbows 50, as the guide pins 42 will pivot in the channels 58. It is pointed out that the coplanar engagement of the spherical contact surfaces 56 of the structure elbows 50 and the spherical contact surfaces 40 of the drive roller supports 34 enables this rotation of the assemblies 35 with respect to the structure elbows 50.

The drive-mode external sleeve 66 is tube-shaped and has an internal diameter slightly larger than the external diameter of the internal sleeve 60, so as to be in sliding contact therewith. The drive-mode external sleeve 66 has three obround openings 68 which are equidistantly spaced and are each of the same dimensions. The drive-mode external sleeve 66 further comprises helical channels 70 between adjacent obround openings 68. The obround openings 68 are adapted for receiving therethrough the arcuate flanges 52 of the structure elbows 50. As the obround openings 68 are only slightly larger than the arcuate flanges 52, the drive-mode external sleeve 66 is limited to movement along one rotational degree of freedom about the drive axis D. The helical openings 70 are adapted for receiving therein a portion of the sockets 48. With the orientation of the helical openings 70, and the fact that the drive-mode external sleeve 66 is kept from moving in translation on the drive axis D, a rotation of the drive-mode external sleeve 66 will cause the internal sleeve 60 to translate with respect to the drive axis D as the sockets 48 will move upward or downward in the helical openings 70. As mentioned earlier, a translation of the internal sleeve 60 on the drive axis D will have the drive rollers 30 rotating in the Z-axis.

The reverse-mode external sleeve 72 has an internal diameter slightly greater than the external diameter of the drive-mode external sleeve 66, so as to be in sliding contact therewith. The reverse-mode external sleeve 72 also has obround openings 74 which are equidistantly spaced on the periphery of the reverse-mode external sleeve 72. Helical openings 76 are positioned between adjacent ends of obround openings 74. However, when compared with the drive-mode external sleeve 66, the helical openings are oriented in an opposite direction. The helical openings 76 are adapted for receiving therein a portion of the sockets 48, whereas the obround openings 74 receive the arcuate flanges 52 therethrough such that the reverse-mode external sleeve 72 is restricted in rotating about the drive axis D, i.e., has one rotational degree of freedom. Once more, a rotation of the reverse-mode external sleeve 72 will be transformed into a translation motion of the internal sleeve 60 (through the sockets 48 engaging displacements in the helical openings 76), and thus into a rotation of the drive rollers 30 in the Z-axis.

Still referring to FIG. 1, the toric-drive transmission 10 is provided with various gears and shafts to receive the driving input from the engine and output the transmitted motion to the wheels. It is pointed out that the toric-drive transmission given as an example in FIG. 1 has both the input and output-on the same side. The toric-drive transmission 10 may also be provided with the input on one side and the output on opposite sides of the transmission 10. The same-side input/output mechanisms, which will be described briefly hereinafter, are only provided for describing an embodiment of the present invention, and are by no means limitative. The input from the engine (not shown) is received by gear 100. The gear 100 has teeth 102 at a front end thereof for meshing with a gear at the output of the engine, and has claws 104 projecting outwardly from a flanged portion thereof. The claws 104 mate with the connection slots 18 (FIG. 2) in the drive disk 12 so as to rotate therewith. A bearing 106 is sandwiched between the gear 100 and the drive disk 12 and will support both the gear 100 and the drive disk 12 on a driveshaft 108. Spacers 110 are received in the gear 100 and allow the latter to rotate freely about the driveshaft 108.

The driveshaft 108 is elongated and has at a first end thereof threads 112 and splines 114. The other end of the driveshaft 108 is equipped with a gear portion 116. When the toric-drive transmission 10 is assembled, with the rollers 30 in contact with both the drive disk 12 and the driven disk 22, the driveshaft 108 extends beyond the driven disk 22 such that the spline 114 and the threads 112 emerge outwardly therefrom. A transmission ring 118, having a through bore comprising slots corresponding to splines 114, is secured to the splines 114 of the driveshaft 108. The transmission ring 118 has claws 120, which mate with the connection slots 28 of the driven disk 22. Therefore, the transmission ring 118 rotates with the driven disk 22. Furthermore, as the transmission ring 118 is secured to the spline 114 of the driveshaft 108, the driveshaft 108 rotates with the driven disk 22. A nut 122 which is tapped is received on the threads 112 of the driveshaft 108 and ensures that the transmission ring 118 stays on the driveshaft 108 by pushing a washer 121 thereagainst. Furthermore, keys 124 ensure that the transmission ring 118 and the washer 121 rotate together, and thus that the nut 122 does not become loosened.

A Belleville spring 126 is sandwiched between the driven disk 22 and the transmission ring 118. The Belleville spring 126 consists of a ring of resilient material, whereby it may be squeezed so as to allow the driven disk 22 to slightly translate on the drive axis D when engaged with the transmission ring 118. Although the spacing between the drive disk 12 and the driven disk 22 is in theory constant, slight variations of the spacing therebetween are anticipated due to thermal expansion or contraction for instance. Therefore, the Belleville spring 126 provides the contact force in order for the driven disk 22 to be in contact with the drive rollers 30 at all times. The toric-drive transmission 10 does not require an overly large casing, as the contact force between the drive rollers 30 and the disks 12 and 22 is in the axial direction and is thus sustained by the driveshaft one way.

Now that the toric-drive transmission 10 has been described in detail, the steps for changing ratios will be described. For clarity purposes, all components rotating about the drive axis D will be referred to as turning in direction A, or in direction B, which is opposite direction A. FIGS. 1 and 5A to 5C have been added with vectors A and B for illustrating the rotation direction. According to the driving mode of the vehicle, the drive disk 12 will be rotating in either direction A or B. If the vehicle is moving forward, the drive disk 12 will, for instance, be rotating in direction A upon receiving the engine output. When the drive disk 12 is rotating in direction A, the driven disk 22 will be rotating in direction B, as a result of the transmitted rotation by the rollers 30. As mentioned above, in transmitting the rotation from drive disk 12 to driven disk 22, the rollers 30 rotate about their respective X-axes.

Initially, the drive rollers 30 are in a speed reduction position within the transmission 10, as illustrated in FIG. 5A. In this position, the drive disk 12 rotates faster than the driven disk 22. In speed reduction, more torque is provided to the wheels, and this position is preferably used when the vehicle is idle or needs high torque. As the drive rollers 30 rotate about their Z-axes toward a direct drive (as shown in FIG. 5B), the input-to-output ratio gradually decreases and, in doing so, the driven disk 22 increases speed with respect to the drive disk 12.

When the vehicle is in the drive mode, the drive-mode external sleeve 66 will be active in allowing to change speed ratios between the drive disk 12 and the driven disk 22 while the reverse-mode external sleeve 72 is inactive. To increase the rotating speed of the driven disk 22, and thus reduce the input-to-output ratio, the drive-mode external sleeve 66 is rotated in the A direction, thereby entraining the sockets 48 (and ultimately the drive rollers 30) with the respective helical openings 70 pressing against the sockets 48. The internal sleeve 66 is entrained in this rotation by the action of the sockets 48 against the holes 62. As a result, and as mentioned above, the drive rollers 30 will rotate about their respective Y-axes. More-specifically, the drive-mode external sleeve 66 will guide the follower spheres 46 into rotating the assemblies 35, and the engagement of the guide pins 42 in the channels 58 allows this pivoting. In other words, the assemblies 35 will slide against the spherical contact surfaces 56 while being guided by their respective pins 42 following the paths defined by the channels 58, and thus having the rollers 30 rotate with respect to their Y-axes. This will result in the rollers 30, which were defining a circular path on the drive disk 12 and the driven disk 22 (i.e., R1 and R2 remaining constant), changing to a spiral path on the drive disk 12 and the driven disk 22 (i.e., with, in this case, R1 continuously decreasing while R2 continuously increases) In taking a spiral path, the rollers 30 will further pivot with respect to their Y-axes.

When the desired actuation input on the external sleeve 66 is reached (e.g., a desired amount of tilt about the Y-axis has been given), the drive-mode external sleeve 66 is fixed with respect to the toric-drive transmission 10. Once in the spiral path, the rollers 30 will have a tendency to move back to their initial Y-axis orientation, i.e., as they were prior to being displaced by the internal sleeve 60/external sleeve 66 rotation. They will thus exert pressure on the internal sleeve 60 and the drive-mode external sleeve 66 in order to return to that Y-axis orientation. As the sockets 48 are immovably secured to the internal sleeve 60, this force exerted by the drive rollers 30, to move out of their spiral pattern, will be exerted on the drive-mode external sleeve 66, which, as mentioned above, is now fixed and immovable with respect to the toric-drive transmission. Since the sockets 48 are in the helical openings 70, a return of the drive rollers 30 to their initial Y-axis orientations will displace the sockets 48 in the direction of arrow 1 in the helical opening 70. As the drive-mode external sleeve 66 is immovable, this will result in the internal sleeve 60 moving toward the driven disk 22 in the D-axis direction, i.e., to the left in FIG. 1. This will cause the drive rollers 30 to rotate in their respective Z-axes as a result thereof and, to return to a circular path and a constant input/output ratio, but having caused a decrease in the input-to-output ratio toward a direct-drive position, as illustrated in FIG. 5B, or an overdrive position, as shown in FIG. 5C, in having pivoted along the Y-axis.

To increase the input-to-output ratio when the drive disk 12 is in the drive mode, i.e., rotates in A, the rotation of the drive-mode external sleeve together with the internal sleeve 60 would be opposite, and thus in the B direction. This will cause the sockets 48 to move in the direction opposite arrow 1 in the helical openings 70, as shown in FIG. 1.

Throughout the changes of ratios in the drive mode of the toric-drive transmission 10, the reverse-mode external sleeve 72 is unrestricted from rotating about the D-axis, to comply with the motion of the sockets 48 in the helical openings 70 of the drive-mode external sleeve 66. If the toric-drive transmission 10 were in reverse mode, the drive-mode external sleeve 66 would be unrestricted from rotating about the D-axis, while the reverse-mode external sleeve 72 would be controlled as described above for the drive-mode external sleeve 66. In the case of the reverse mode, the drive disk 12 will be rotating in direction B, and the driven disk 22 will thus be rotating in direction A. Accordingly, with the same logic as for the drive mode explained above, the initiating of a decrease in the input-to-output ratio will be achieved by a rotation of the reverse-mode external sleeve 72 with the internal sleeve 60 in the B direction, whereas an A-direction rotation would cause an increase in the input-to-output ratio. A rotation of the external sleeve 72/internal sleeve 60 causes a Y-axis rotation of the rollers 30, resulting in a spiral path of the rollers 30 with respect to the disks 12 and 22. When the desired actuation input of the internal sleeve 60 is reached and the external sleeve 72 is locked, the rollers 32 are subjected to an opposite Y-axis rotation, hence causing a Z-axis rotation and circular motion of the rollers 30, to a desired input/output ratio.

An advantage of the present invention resides in the fact that no great forces need to be applied to the drive rollers in order to initiate input-to-output ratio changes. As mentioned above, the initiation of the ratio change is achieved by rotating the internal sleeve 60, which entrains the drive-mode external sleeve 66 or the reverse-mode external sleeve 72. Therefore, there is no need for a hydraulic control in order to initiate the ratio changing. The toric-drive transmission 10 of the present invention is thus advantageous when used with vehicles having low-power engines, as the power of the engine is not used for running a hydraulic system, and thus has its energy efficiency increased. As the control of the ratio is initiated in a direction perpendicular to the traction force, the control may be a low-power control, such as an electronic or electromechanical control, actuating displacements of the respective sleeves 60, 66 and 72.

It is contemplated to provide alternative controller systems to the sleeves 60, 66 and 72. With the level of quality of linear actuators, a fully electronic controller system could be provided to actuate the displacement of the drive rollers 30 as described above. The above described controller system with the sleeves 60, 66 and 72 is advantageous in that it ensures a synchronization of the displacement of the drive rollers 30, while remaining relatively simple. Moreover, in case of failure of the electrical system of the vehicle, the input-to-output ratio of the toric-drive transmission 10 remains constant with the use of the above described controller system.

As mentioned above, the power transmittal between the drive rollers 30 and the drive disk 12/driven disk 22 will be made through a film of oil which is on the surface of the grooves 14 and 24. Due to the forces evolving in such a power transmission, the oil ensuring the contact between the drive rollers 30 and the disks 12 and 22 will be in a semi-solid state under high pressure, the phase being referred to as elastohydrodynamic phase. A traction oil is thus needed, as the instantaneous viscosity and the shear modulus will be increased many times their normal condition. The oil film allows to increase the longevity of the toric-drive transmission, as metal-to-metal contact would damage the pieces at an incredibly fast rate. Santotrac™ oil from Monsanto is an example of a traction oil adapted for being used with the toric-drive transmission 10 of the present invention.

The toric-drive transmission 10 is provided with an adequate lubrication system, which will ensure that the grooves 14 and 24 of the drive disk 12 and the driven disk 22, respectively, have the required oil film thereon. Deflectors may be installed in the toric-drive transmission 10 to direct oil toward the contact surfaces between the drive rollers 30 and the disks 12 and 22. It is pointed out that the spin is equal but in opposite directions on opposed sides of the contact surface between the drive rollers 30 and the disks 12 and 22. The effect of the spin is thus cancelled.

As mentioned above, the peripheral surface 32 of the drive roller 30 is slightly convex, in order to minimize the contact surface between the peripheral surface and the oil film on the disk 12 or 22. The contact surface is typically oval shaped and has radii of 1 and 2 mm. This allows reduction to the spin resulting from the power transmittal between the disks 12 and 22 and the rollers 30. Spin is a phenomenon which occurs due to the fact that the rotating speed is generally the same at all points of the peripheral surface 32 of the drive roller 30, whereas the rotational speed changes on the disks 12 and 22 according to the radial position. The rotational speed transmitted to the peripheral surface 32 by the drive disk 12 increases on the contact surface therebetween, as the outermost point of the contact surface with respect to the center of the drive disk 12 has a greater rotational speed than the closest point of the contact surface with respect to the center of the drive disk 12. Accordingly, spin occurs and energy losses therewith. Therefore, by minimizing the contact surface with the peripheral surface 32 of the drive rollers 30, both the spin and the energy losses are minimized.

Figure 6:
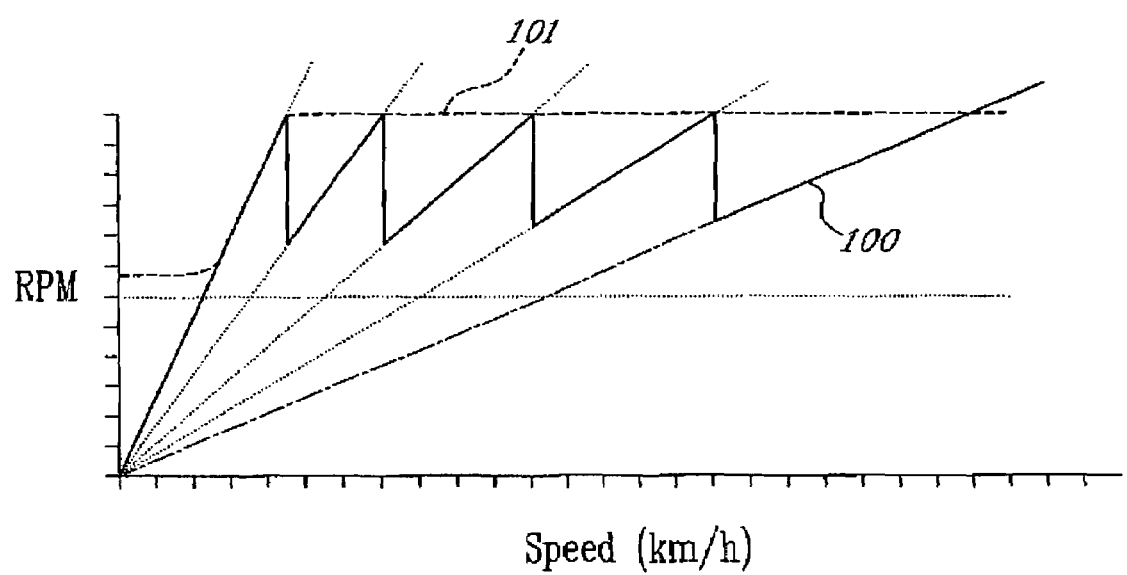
FIG. 6 is a graph illustrating the speed vs. the RPM of a CVT in comparison with a discontinuous-drive transmission.

Referring now to FIG. 6, a graph is shown illustrating the speed vs. the RPM in a comparison of a CVT, such like the toric-drive transmission 10 of the present invention, and a discontinuous-ratio transmission. Curve 100 shows the various speed ratios of a discontinuous-ratio transmission, whereas curve 101 shows the constantly changing ratios of the toric-drive transmission 10. The areas under the curves show the acceleration potential of the two types of transmissions. As the area under the curve is greater for the toric-drive transmission 10, the toric-drive transmission 10 may thus uniformly accelerate while keeping the motor at its highest power. Furthermore, although the graph represents vertical lines between the change of gears of the discontinuous-ratio transmission, there is a slight loss of vehicle velocity when a ratio change occurs with the discontinuous-drive transmission. This loss of velocity may be troublesome in harsh conditions, for instance, when the vehicle is sunk into snow or mud.

The invention claimed is:

1. A toric-drive transmission comprising:
    a drive disk for receiving a power input;
    a driven disk for transmitting a power output;
    a roller device having a roller displaceably mounted between the drive disk and the driven disk, the roller having three rotational degrees of freedom, a first one of the rotational degrees of freedom for transmitting motion from the drive disk to the driven disk so as to convert the power input to the power output, a second one of the rotational degrees of freedom for varying a ratio of the power output to the power input as a function of an orientation of the roller along the second one of the rotational degrees of freedom, and a third one of the rotational degrees of freedom for initiating a rotation of the roller about the second one of the rotational degrees of freedom; and
    a controller system having two sleeves enclosing the roller and operatively connected to the roller device for changing the orientation of the roller in the second one of the rotational degrees of freedom by actuating a displacement of the roller in the third one of the rotational degrees of freedom, a first one of the sleeves being actuatable for displacing the roller along the third one of the rotational degrees of freedom from a first orientation to a second orientation, and a second one of the sleeves being actuatable for displacing the roller along the second one of the degrees of freedom as a function of the second orientation along the third one of the rotational degrees of freedom.

2. The toric-drive transmission according to claim 1, wherein the controller system has a third sleeve enclosing the first and second one of the sleeves and operatively connected to the roller device, the third sleeve being actuatable for displacing the roller along the second one of the degrees of freedom subsequent to a displacement of the roller along the third one of the rotational degrees of freedom for a reversed power input.

3. The toric-drive transmission according to claim 2, wherein the first one of the sleeves has one rotational degree of freedom about a rotational axis of the power input and one translational degree of freedom along the rotational axis of the power input, the second one of the sleeves has one rotational degree of freedom common to the rotational degree of freedom of the first one of the sleeves, and the third sleeve has one rotational degree of freedom common to the rotational degree of freedom of the first and the second ones of the sleeves.

4. The toric-drive transmission according to claim 1, wherein the first one of the sleeves has one rotational degree of freedom about a rotational axis of the power input and one translation degree of freedom along the rotational axis of the power input, and the second one of the sleeves has one rotational degree of freedom common to the rotational degree of freedom of the first one of the sleeves.

* * * * *